Dec. 18, 1956  W. H. SCHECHTER  2,774,136
TORCH WELDING
Filed Jan. 13, 1953

INVENTOR.
WILLIAM H. SCHECHTER
BY
Brown, Critchlow, Flick & Peckham
his attorneys.

United States Patent Office 2,774,136
Patented Dec. 18, 1956

2,774,136

TORCH WELDING

William H. Schechter, Zelienople, Pa., assignor, by mesne assignments, to Callery Chemical Company, Pittsburgh, Pa., a corporation of Pennsylvania Application January 13, 1953, Serial No. 330,947

6 Claims. (Cl. 29—494)

This invention relates to torch, or gas, welding, and more particularly to a novel flux and a method of supplying it to the work in the flame.

A common practice in torch welding is either to apply solid flux to the workpiece, or where filler metal is used to dip it into a supply of flux from time to time, as need be. Such practices are attended by various disadvantages. Usually the flux leaves a residue that must be removed, as by brushing or washing, and since the flux is in a fused state that may be difficult. The necessity for removing residual flux adds to the time required for a gas welding operation and therefore to its cost. Where flux is supplied by the filler metal, the welding must be interrupted frequently in order to dip the metal, such as wire, in the flux.

More recently, trimethylborate [B(OCH$_3$)$_3$] has been used to some extent as a flux by feeding it into the gas stream going to the torch. This overcomes the foregoing disadvantages but this practice likewise suffers from the fact that this borate is a liquid which consequently results in disadvantages, especially in work outside the shop, i. e., in field operations.

It is among the objects of this invention to provide a method of torch welding that makes use of a novel flux material, in which the flux is fed to the torch flame, which is simple, which makes use of solid flux that is readily and relatively inexpensively prepared and leaves no objectionable residue, and which minimizes or overcomes the disadvantages of prior practices alluded to above.

Figure 1:
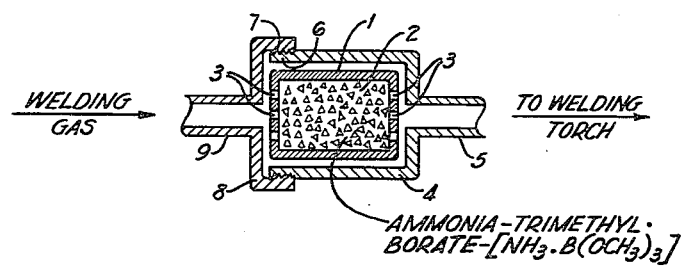
Figure 2:
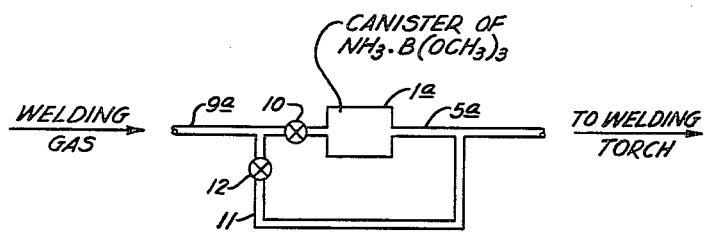

The invention will be described with reference to the accompanying drawings in which Fig. 1 is a longitudinal sectional view of means for practicing the method of the invention; and Fig. 2 is a schematic representation of a modified embodiment.

In accordance with the present invention welding gas is passed on its way to the torch into contact with solid product of reaction between ammonia (NH$_3$) and a lower alkyl borate [B(OR)$_3$]. The product of reaction, which is solid, is believed to be an addition product of the formula B(OR)$_3$:NH$_3$. In the case of trimethylborate the product thus may be termed ammonia-trimethylborate: B(OCH$_3$)$_3$:NH$_3$. Various lower alkyl borates, for instance the ethyl, propyl and butyl compounds, might be used. However, they tend to be unstable at the temperatures normally encountered in welding operations and therefore the ammonia-trimethylborate addition product is preferred because its stability is satisfactory under all normal conditions and because it possesses other properties that especially adapt it to this use, as will appear.

These ammonia-alkyl borate addition products may be made readily in various ways disclosed in Patent No. 2,629,732, granted February 24, 1953, on my copending application Serial No. 225,669, filed May 10, 1951, of which the present application is a continuation-in-part.

For instance, pure methyl borate may be saturated with dry ammonia gas at room temperature and pressure. The crystalline compound that separates out corresponds to the formula given above for ammonia-trimethylborate. Still another mode of making ammonia-trimethylborate is to pass trimethylborate vapor with dry gaseous ammonia in excess of the stoichiometric requirement, using nitrogen as a carrier gas, through a reaction tube. The effluent is cooled, for example to 0° C., to freeze out the desired ammonia-methylborate compound and to permit excess ammonia and nitrogen to pass out of the system.

The same compound may be prepared by saturating a mixture of trimethylborate and methanol (CH$_3$OH) with ammonia gas. For this purpose the azeotropic mixture, containing about 70 to 73 percent, by weight, of trimethylborate, is preferred because it affords the least expensive source of that compound. When the azeotrope is saturated with dry ammonia gas at room temperature a compound crystallizes out that appears to contain methanol in the form of a further addition compound [B(OCH$_3$)$_3$:NH$_3$:(CH$_3$OH)$_x$]. For the purposes of the invention ammonia-trimethylborate prepared in this manner is preferred because the methanol does not interfere with the fluxing action and is not otherwise objectionable, and because the flux prepared in this way is cheaper than when made from pure trimethylborate.

The ammonia-addition compounds described may be supplied to the welding gas in various ways. For instance, the solid may be finely powdered and fed at an appropriate rate through an automatic feeding device into the gas stream as it passes to the torch. Preferably, however, the addition compound in the form of lumps of, for example, 4 to 16 mesh size, is packed in hermetically sealed containers. When the flux is to be used the ends of the container are punctured and it is disposed in the gas line, by appropriate mechanical means, so that the gas traverses the canister and picks up vapor of the addition compound.

Fig. 1 is a schematic representation of one means for practicing the invention. As shown in the drawing a metallic canister 1 is filled with granules 2 of ammonia-trimethylborate addition compound, and the canister is closed in accordance with practice standard in the canning industry. When it is to be used the opposite ends are punctured to provide a plurality of openings 3 and it is then disposed in a casing member 4 one end of which is associated with a tubular member 5 leading to the welding torch. The opposite end 6 of casing 4 is provided with exterior threads 7 for cooperation with a threaded closure member 8 that is associated with one of the gas lines leading to the torch. As indicated above, the flow of gas through the canister results in supplying the gas with an amount of the ammonia-trimethylborate addition compound.

The vapor pressure of the ammonia-trimethylborate compound is about 150 mm. at 20° C., and it reaches 760 mm. at about 113° C. Consequently, the vapor pressure at normal atmospheric temperatures is such as to supply an ample quantity of the ammonia-trimethylborate compound to the welding gas. If, depending on the temperature and the welding gas there is a tendency for the gas going to the torch to pick up an excess or uneconomical amount of the addition compound, the amount fed to the flame can be regulated easily by by-passing a portion of the gas around the canister or other source of supply. One means for accomplishing this is indicated schematically in Fig. 2 in which the line 9a feeding gas from a supply source is associated with a canister 1a like that described above and which is in turn connected to the line 5a leading to the torch. Line 9a is provided with a valve 10 in advance of which there is a by-pass line 11 that is connected to line 5a beyond the canister and is provided with a valve 12. By appropriate adjustment of the valves 10 and 12 the volume of gas passing through the canister may be regulated with consequent regulation of the amount of addition compound supplied to the flame.

Experience with the method provided by the invention has shown that in addition to satisfactorily accomplishing its stated objects, a better bead of welding metal is produced than in the case of other fluxing practices known and used heretofore.

Although the invention is applicable generally to gas welding it is particularly suited to oxy-acetylene welding, in which case it is preferred to use the acetylene line for pick up of the flux.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a method of torch welding, the step of supplying flux to the flame comprising passing welding gas on its way to the torch into contact with solid product of reaction between ammonia and a lower alkyl borate.

2. In a method of torch welding, the step of supplying flux to the flame comprising passing welding gas on its way to the torch into contact with solid products of reaction between ammonia and methyl borate.

3. In a method of oxy-acetylene torch welding, the step of supplying flux to the flame comprising passing the acetylene welding gas on its way to the torch into contact with solid product of reaction between ammonia and methyl borate.

4. A method according to claim 2 in which said product is $B(OCH_3)_3:NH_3:(CH_3OH)_x$.

5. In a method of torch welding, the step of supplying flux to the flame comprising passing welding gas on its way to the torch through a canister containing solid product of reaction between ammonia and methyl borate.

6. A method according to claim 5, the amount of said product supplied to the flame being regulated by by-passing a portion of the welding gas around said canister.

References Cited in the file of this patent

UNITED STATES PATENTS

| | | |
|---|---|---|
| 2,181,094 | Ness | Nov. 21, 1939 |
| 2,211,448 | Vaughn et al. | Aug. 13, 1940 |
| 2,235,965 | Ness | Mar. 25, 1941 |
| 2,262,187 | Lytle et al. | Nov. 11, 1941 |
| 2,277,064 | Bialosky et al. | Mar. 24, 1942 |
| 2,295,702 | Wissler | Sept. 15, 1942 |
| 2,327,337 | Burch et al. | Aug. 24, 1943 |
| 2,629,732 | Schechter | Feb. 24, 1953 |